US005513829A

United States Patent [19]

Hodges

[11] Patent Number: 5,513,829

[45] Date of Patent: May 7, 1996

[54] CRADLE SUPPORT HOLDER

[76] Inventor: Douglas Hodges, 672 W. 12th St., San Pedro, Calif. 90731

[21] Appl. No.: 392,206

[22] Filed: Feb. 22, 1995

[51] Int. Cl.$^6$ .................... F16M 1/00

[52] U.S. Cl. .................... 248/670; 248/172; 248/178.1

[58] Field of Search .................... 248/670, 671, 248/676, 678, 172, 173, 176.1, 177.1, 178.1, 179.1

[56] References Cited

U.S. PATENT DOCUMENTS

| | | | |
|---|---|---|---|
| 1,209,388 | 12/1916 | Brown | 248/173 |
| 1,878,787 | 9/1932 | Luff | 248/172 |
| 4,033,653 | 7/1977 | Doring | 248/172 X |
| 4,660,796 | 4/1987 | Garrec | 248/671 X |
| 4,804,162 | 2/1989 | Rice | 248/671 |
| 4,932,628 | 6/1990 | Pacheco | 248/671 X |
| 5,308,037 | 5/1994 | Gonzalez | 248/676 X |
| 5,362,025 | 11/1994 | Trom | 248/670 |
| 5,401,171 | 4/1995 | Gonzalez | 248/678 X |

FOREIGN PATENT DOCUMENTS

| | | | |
|---|---|---|---|
| 2375846 | 9/1978 | France | 248/670 |

*Primary Examiner*—J. Franklin Foss
*Attorney, Agent, or Firm*—Roger A. Marrs

[57] ABSTRACT

A cradle support handler is disclosed herein interfacing between a conventional telescoping lifting device and an automotive component which includes a box-like construction or support having a central opening and outwardly extending arms terminating with support pads and location point registration or indexing pins. The arms are pivotal carried on the box-like support and the pads provide at least three or four point support of the automotive component. The extendable arms provide a wide area of applied load distribution and adaptors may be disposed on the box-like support for accommodating straps, hold-down devices and transmission plates.

4 Claims, 2 Drawing Sheets

FIG. 1
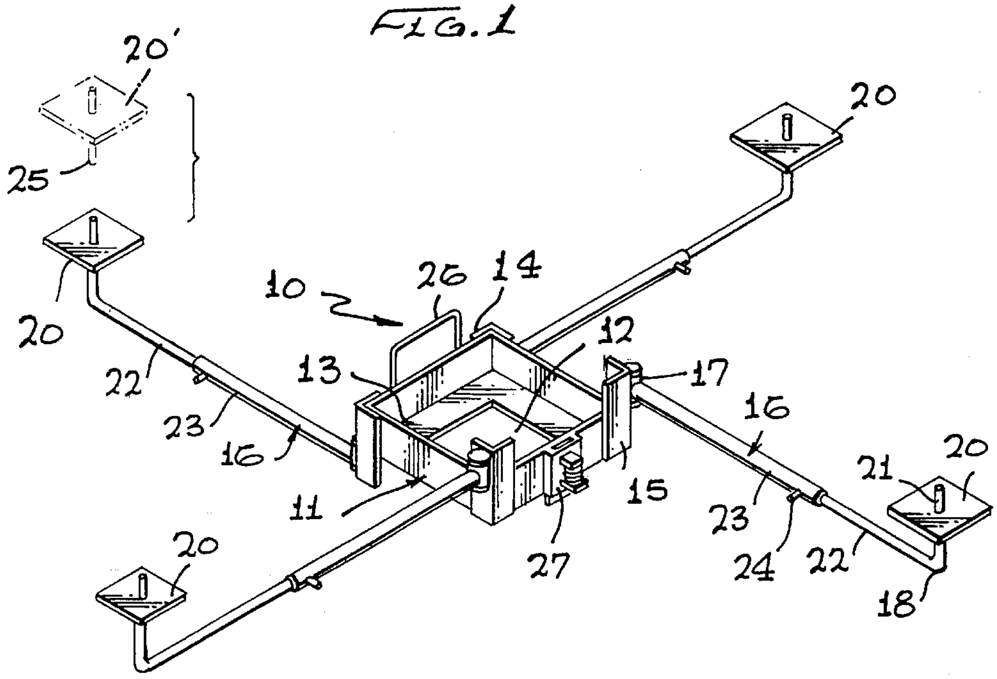
FIG. 2
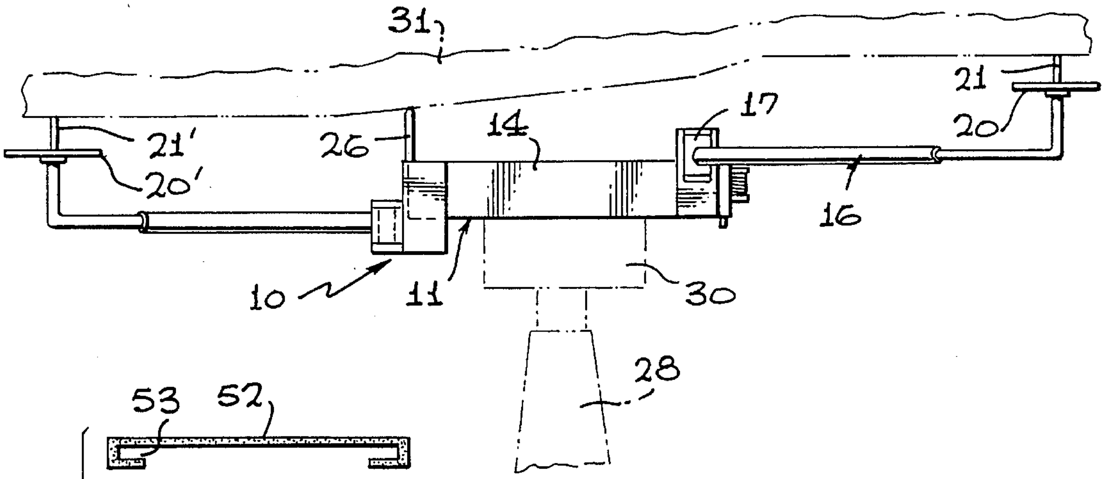
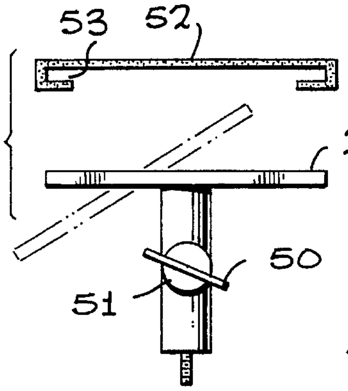
FIG. 7

FIG. 3
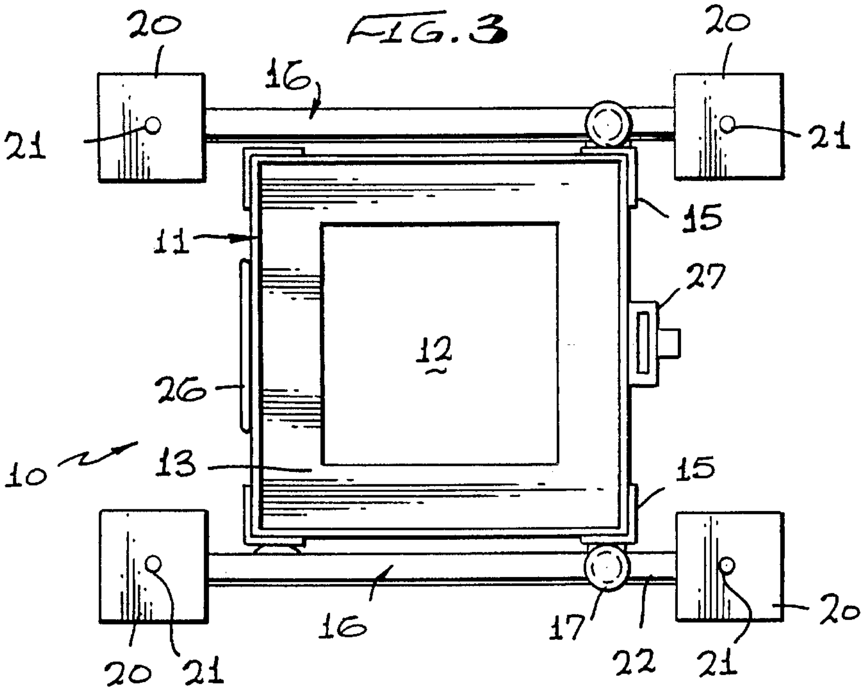
FIG. 4
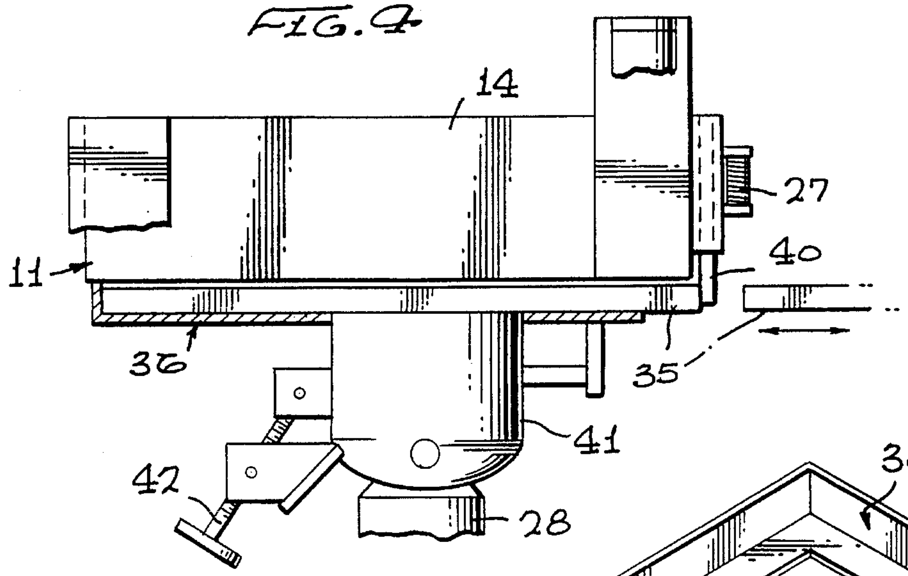
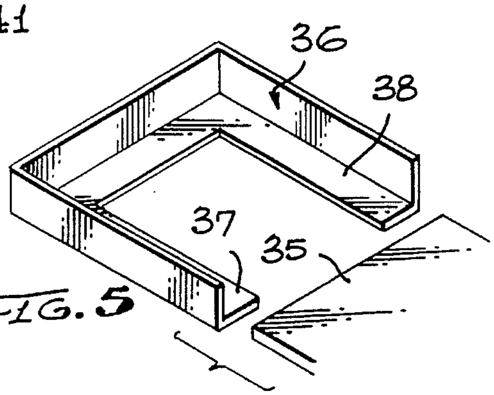
FIG. 5
FIG. 6
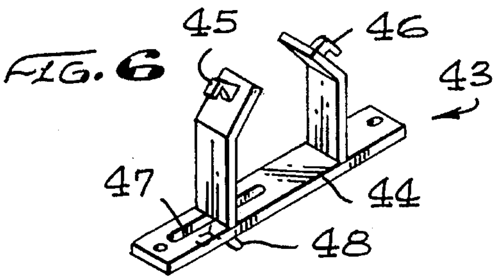

CRADLE SUPPORT HOLDER

BACKGROUND OF THE INVENTION

1. Field of the Invention

The present invention relates to the field of automotive equipment devices, and more particularly to a novel cradle support and handling means which interfaces between a conventional telescoping jack and an automotive component whereby the component is supported in a stabilized and convenient manner.

2. Brief Description of the Prior Art

In the past, it has been the conventional practice to remove automobile components, such as transverse transmissions, from their installation on a vehicle for service and maintenance purposes. In this connection, it is conventional to use a telescoping jack for not only supporting the weight of the automotive component but effectively raises and lowers the component for removal and installation. Oftentimes, the component includes a cradle which is difficult to maintain in alignment and to stabilize on the head of the telescoping jack. Unless the automotive component cradle or the component itself is properly stabilized, the component, such as the transverse transmission, may topple and fall from the jack as the jack is moved from place to place. Such an unstable condition usually results from a very narrow base area of support for the component. Most jack heads do not incorporate extensions or support plates of sufficient area to properly engage, register with and support the load being carried.

Therefore, a long-standing need has existed to provide a novel support and handling means for the automotive component which incorporates stability, reliance and versatility, as well as being lightweight and durable. Preferably, the means should incorporate extensions for receiving applied loads once the automotive component has been placed on the means so that a wide support is provided which evenly distributes the load forces into the jack head.

SUMMARY OF THE INVENTION

Accordingly, the above problems and difficulties are avoided by the present invention which provides a novel component support handling device which interfaces between a conventional lifting jack and the component by which applied forces are more evenly distributed than can be obtained without the use of the support and handler means. In one form of the invention, the support and handler means includes a box-like structure having a central opening through which the head of a conventional telescoping jack projects. The edge marginal regions of the support box surrounding and defining the central opening are supported on the body of the jack. The box-like structure further includes a plurality of outwardly extendable arms pivotally carried at respective corners of the box-like structure and which support, at their free ends, an attachment pad which includes indexing means employed to register with location attachment points on the automotive component being supported. The plurality of extendable arms are composed of telescoping sections which slide with respect to one another so as to adjust the length or distance of the pads from the central opening. If desired, tilting means may be provided for each one of the support pads whereby the pad may be tilted or angled with respect to the location point required for attachment or support. Also, adaptors may be readily attached to the box-like structure for support and other hold-down means such as rubber straps or the like.

Therefore, it is among the primary objects of the present invention to provide a novel automotive component support and handler which interfaces between a lifting device and an automotive component whereby the component is balanced, stabilized and releasably held on the jack so that instability and swaying of the component is avoided.

Another object of the present invention is to provide a novel interfacing support device between a lifting jack and an automotive component, such as a transverse transmission and cradle, which incorporates stability, reliance and versatility as well as being lightweight and durable.

Still a further object of the present invention is to provide a general purpose component handling means which has the ability of adjusting to a variety of automotive components so that load distribution is evenly distributed when the load is being transported by the device from one place to another.

Yet another object of the present invention is to provide an automotive equipment or component handling means which includes multiple extendable arms adapted to expand the base of support beyond the conventional area of a jack head lifting device.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken-in connection with the accompanying drawings in which:

FIG. 1 is a front perspective view showing the novel automotive equipment or component support and handling device incorporating the present invention;

FIG. 2 is an enlarged side elevational view of the device shown in FIG. 1;

FIG. 3 is a top plan view of the inventive support and handling device illustrated in its storage position;

FIG. 4 is an enlarged view of the device shown in FIG. 1 employed in connection with a conventional lifting jack or the like;

FIG. 5 is a fragmentary perspective view showing an attachment means for the additional of a sliding plate to the box-like structure shown in the device of FIG. 4;

FIG. 6 is a front perspective view of an adaptor constituting a hold-down device which may be employed with the support and handler shown in the previous FIGURES; and FIG. 7 is a side elevational view of a pad structure used on the free ends of the extendable arms in the device of FIG. 1 so as to tilt or angle the pad.

DESCRIPTION OF THE PREFERRED EMBODIMENT

Referring to FIG. 1, the novel support and handling device of the present invention is indicated in the general direction of arrow 10, which includes a box-like support, indicated by numeral 11, which includes a central opening 12 defined by a surrounding edge marginal region 13. The box-like support 11 includes a continuous sidewall 14 which surrounds the edge marginal region 13. On each corner of the structure 11, there is provided a retainer 15 which pivotally mounts an extendable arm 16. The pivot connection is indicated by numeral 17 and the fixture is attached to the mount 15 by suitable means. The opposite end of the extendable arm 16 is provided with an angle piece 18 that supports a pad 20. The pad 20 may include an indexing pin 21 which is placed in registry with a location or connection point on the automotive component intended to be supported. It is noted that the piece 18 includes a section which is horizontal and a section which is normal thereto on which the pad 20 is attached. Also, the arm 16 is of a telescoping construction wherein an outer section 22 slides into and out of a main section 23. A threadable locking mechanism is indicated by numeral 24 so that the sections 22 and 23 can be fastened together once their length has been determined. Also, as shown in broken lines, the pad 20' may be removed from the piece 18 by lifting so that a support pin 25 is removed from a receptacle in the end of piece 18. A handle 26 may be employed for carrying the device from place to place and may be useful in setting up the equipment. A fixture 27 is employed for accommodating various adaptors and hold-down devices, if needed.

Referring now in detail to FIG. 2, the support and handling device of the invention is illustrated in combination with a lifting jack 28 which includes a head 30 adapted to engage with the edge marginal region 13 or bottom of the box-like structure. Therefore, when the jack head 30 is raised, the support and handling device 10 will be carried upwardly along with its load which is indicated by numeral 31 and may take the form of a transverse transmission or the like. Preferably, the attachment pins 21 on each of the respective pads 20 are engaged with preselected location points on the automotive component 31 and if useful, the handle 26 may become a support point as well.

Referring now in detail to FIG. 3, the device and apparatus shown in FIG. 1 is illustrated in its collapsed or stored position wherein the outer sections 22 of each of the respective extendable arms 16 have been inserted into the main section 23. However, even though this may be a storage configuration, the device is still useful for its interfacing purposes between a jack and a component intended to be lifted.

Referring now in detail to FIGS. 4 and 5, a modification is illustrated whereby a transmission plate, as indicated by numeral 35, may be insertably received within a guide structure 36. The guide structure includes an opening at one end, as seen clearly in FIG. 5, wherein the end of the plate 35 can be inserted on the side rails 37 and 38 for supporting purposes. Once the plate has entered into the guide 31,, a latch 40 may be lowered into place for retention purposes. It is to be understood that the guide 36 is carried on the underside of the box-like support 11 by any suitable means, such as welding or the like. The jack head is indicated by numeral 41 which may be arranged to pivot when a threadably handle 42 is rotated. However, it is to be understood that no part of the jack or the jack head forms a part of the present invention except for usage purposes.

Referring now in detail to FIG. 6, it can be seen that an adaptor 43 may be employed which includes a base 44 having hook members 45 and 46 carried thereon so that a strap means of a resilient type can be hooked thereon and used as a hold-down device. The hook 45 is readily adjustable with respect to spacing from hook 46 by means of a slotted adjustment through which a wing nut bolt may travel. The slot is indicated by numeral 47 and the wing nut by numeral 48.

Referring now in detail to FIG. 7, it can be seen that the pad 20 may be angled by means of a finger-operated locknut 50 in combination with a rotary thimble 51. As the finger-operated locknut 50 is rotated, the pad 20 may be rotated to the position shown in broken lines. Also, a soft pad 52 may be carried on the pad 20, if desired, and, in one form, the soft pad 52 includes slots which may be slid over the opposite sides of the pad 20. Such a slot is indicated by numeral 53.

In view of the foregoing, it can be seen that the support and handling device of the present invention may be readily placed on top of a lifting device, such as a jack, and may then cause its extendable arms to be withdrawn from their storage position so that the pads 20 may be registered with location points on an automotive component intended to be supported. The support and handler of the present invention is an interface device and is employed to accept widely distributed applied load forces and to conduct the applied loads through the extendable arm into the box-like structure and then into the lifting device itself. By making the arms extendable, a wide support area or arrangement is available so that by widening the base of support, toppling or unbalanced situations which would cause sway or the like can be avoided.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An automotive component support and handling apparatus comprising:

a box-like support having a central opening defined by a surrounding plate edge marginal region;

a continuous sidewall carried on said plate edge marginal region in spaced-apart relationship with respect to said central opening;

said box-like member having at least three corners;

at least three extendable arms, each arm having opposite ends;

a pivot device connecting one end of said extendable arm to a selected corner of said box-like support;

a support pad detachably carried on the other end of said arm; and said extendable arm being articulated with respect to said box-like support for selective positioning and location of said pads.

2. The invention as defined in claim 1 wherein:

each of said extendable arms includes a main section and an outer section having their adjacent ends arranged in telescoping sliding relationship.

3. The invention as defined in claim 2 including:

means carried on each of said extendable arms and operably connected to its associated pad for tilting and angling said pad.

4. The invention as defined in claim 3 including:

an adaptor for hold-down purposes having a base detachably carried on said box-like support having a pair of hooks; and a flexible strap detachably coupled between said hooks.

* * * * *